US007649078B1

(12) United States Patent
Paulauskas et al.

(10) Patent No.: US 7,649,078 B1
(45) Date of Patent: Jan. 19, 2010

(54) APPARATUS AND METHOD FOR STABILIZATION OR OXIDATION OF POLYMERIC MATERIALS

(75) Inventors: Felix L. Paulauskas, Knoxville, TN (US); Daniel M. Sherman, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 244 days.

(21) Appl. No.: 11/391,615

(22) Filed: Mar. 28, 2006

Related U.S. Application Data

(63) Continuation-in-part of application No. 11/344,573, filed on Jan. 31, 2006, now Pat. No. 7,534,854.

(60) Provisional application No. 60/666,301, filed on Mar. 29, 2005.

(51) Int. Cl.
C08G 63/02 (2006.01)
B32B 27/06 (2006.01)
(52) U.S. Cl. ............... 528/480; 264/176.1; 264/219; 428/359; 528/176; 528/271; 528/272
(58) Field of Classification Search ............ 264/176.1, 264/219; 428/359; 528/176, 271, 272
See application file for complete search history.

(56) References Cited

U.S. PATENT DOCUMENTS

| 2,789,915 A | 4/1957 | Bishop |
| 2,913,802 A | 11/1959 | Barnett |
| 3,027,222 A | 3/1962 | Wilkinson |
| 3,125,404 A | 3/1964 | Crawley |
| 3,285,696 A | 11/1966 | Tsunoda |
| 3,699,210 A | 10/1972 | Binning et al. |
| 3,708,326 A | 1/1973 | Chenevey et al. |
| 3,720,759 A | 3/1973 | Overhoff |
| 3,814,577 A | 6/1974 | Menikheim |
| 3,817,700 A | 6/1974 | Menikheim |
| 3,820,951 A | 6/1974 | Di Edwardo |
| 3,914,394 A | 10/1975 | Fukushima |
| 3,933,986 A | 1/1976 | Matsumura et al. |
| 4,197,282 A | 4/1980 | Bailly-Lacresse et al. |
| 5,330,935 A | 7/1994 | Dobuzinsky et al. |
| 5,412,246 A | 5/1995 | Dobuzinsky et al. |
| 5,804,108 A | 9/1998 | Wilkinson |
| 6,054,214 A | 4/2000 | Wilkinson |
| 6,083,355 A * | 7/2000 | Spence ............... 204/164 |
| 6,372,192 B1 | 4/2002 | Paulauskas et al. |
| 6,514,449 B1 | 2/2003 | Paulauskas et al. |
| 6,565,927 B1 | 5/2003 | Drzal et al. |
| 6,648,973 B2 | 11/2003 | Drzal et al. |
| 6,649,225 B2 | 11/2003 | Drzal et al. |
| 6,733,737 B1 | 5/2004 | Tan et al. |
| 2003/0051993 A1 | 3/2003 | Ricatto et al. |

OTHER PUBLICATIONS

Peebles, Carbon Fibers, Formation, Structure, and Properties; pp. 7-18, CRC Press, Boca Raton, 1994.
Delmonte, Technology of Carbon and Graphite Fiber Composites; pp. 55-61, Van Nostrand Reinhold, New York, 1981.
Cohn and Das, A Cost Assessment of PAN Fiber Production Technologies: Conventional and Microwave Cases; Oak Ridge National Laboratory report, Oak Ridge, TN, 1999.
Donnet et al., Carbon Fibers, Third Edition; pp. 1-26, Marcel Dekker, New York, 1998.
Kroschwitz, High Performance Polymers and Composites; pp. 34-38, John Wiley and Sons, New York, 1991.
White, Fundamental Studies of Stabilization of Polyacrylonitrile Precursor, pp. 81-90, MS Thesis, University of Tennessee—Knoxville, May 2005.

* cited by examiner

*Primary Examiner*—Terressa M Boykin
(74) *Attorney, Agent, or Firm*—Scully, Scott, Murphy & Presser, P.C.

(57) ABSTRACT

An apparatus for treating polymeric materials comprises a treatment chamber adapted to maintain a selected atmosphere at a selected temperature; a means for supporting the polymeric material within the chamber; and, a source of ozone-containing gas, which decomposes at the selected temperature yielding at least one reactive oxidative species whereby the polymer is stabilized and cross linked through exposure to the oxidative species in the chamber at the selected temperature. The ozone may be generated by a plasma discharge or by various chemical processes. The apparatus may be configured for either batch-type or continuous-type processing. The apparatus and method are especially useful for preparing polymer fibers, particularly PAN fibers, for later carbonization treatments as well as to make flame-retardant fabrics.

21 Claims, 4 Drawing Sheets

APPARATUS AND METHOD FOR STABILIZATION OR OXIDATION OF POLYMERIC MATERIALS

CROSS-REFERENCE TO RELATED APPLICATION

This application is a Continuation-in-Part of Applicants' U.S. patent application Ser. No. 11/344,573 filed on Jan. 31, 2006, now U.S. Pat. No. 7,534,854 which in turn claims the benefit of Provisional Patent Application Ser. No. 60/666,301 filed by the present inventors on Mar. 29, 2005, the entire disclosure of which is incorporated herein by reference.

STATEMENT REGARDING FEDERALLY SPONSORED RESEARCH

This invention was made with Government support under Contract No. DE-AC05-00OR22725 awarded by the U.S. Department of Energy to UT-Battelle, LLC, and the Government has certain rights in this invention.

BACKGROUND OF THE INVENTION

1. Field of the Invention

The invention pertains to apparatus and methods to treat polymeric materials, and more particularly to systems and methods for chemically-assisted oxidation and stabilization of thermoplastic materials in preparation for high-temperature carbonization or for other uses.

2. Description of Related Art

The production of carbon fibers from thermoplastic-based fibers, e.g., polyacrylonitrile (PAN), is typically a multi-step process in which the PAN fibers are first treated in an oxidizing atmosphere at temperatures ranging from ambient up to about 250-300° C., while the fibers are maintained under tension inside of large furnaces. The oxidized fibers are subsequently carbonized at temperatures starting about 500° C. and continuing up to about 1000-1200° C. in an inert atmosphere (carbonization step) and then further heated up to about 3000° C. (graphitization step). Traditionally, the first oxidation or stabilization processing step is the most time-consuming and rate-limiting step in conventional carbon fiber manufacturing, and it requires more space than all other steps combined.

Several methods for PAN-precursor stabilization are known. The most common method is stabilization in air, which usually requires hours to achieve full stabilization. Here the PAN-precursor may be heated in air at a carefully controlled rate up to 250° C. either in a batch process or by heating the precursor tow continuously as it is transported through a furnace or kiln, which contains several temperature zones. Much development work has been directed toward the goal of modifying the conventional stabilization step and reducing the processing time. For example, numerous publications indicate that the stabilization rate can be enhanced by modifying the chemical composition of the precursor fiber either by the use of an additive (co-monomer), or by selective pretreatments such as impregnating with specific chemicals [see Leighton H. Peebles, "Carbon Fibers, Formation, Structure, and Properties," *CRC Press*, pp. 7-26 and 128-35, 1994].

Early methods for stabilizing PAN fibers are taught by Houtz in U.S. Pat. Nos. 2,789,915, 2,913,802, 3,027,222 and 3,125,404, wherein oxidation of PAN under controlled temperature of 220-250° C. for several hours produced infusible material. The fibers, in general, acquired stability by an oxidation and cross-linking process. Oxidized PAN was converted commercially to carbon fibers in the early 1960s. Details are described by Tsunoda in U.S. Pat. No. 3,285,696. It was indicated in these patents that direct heating of PAN fibers to 1000° C. in a non-oxidizing atmosphere (nitrogen) produced a brittle, low-strength fiber product. However, with an oxidative pre-treatment step, a much stronger fiber was obtained when this material was subsequently processed to 1000° C. in an inert atmosphere [see John Delmonte, "Technology of Carbon and Graphite Fiber Composites," *Van Nostrand Reinhold Co.*, New York, p. 55-61, 1981].

The technical literature indicates clearly that stabilization or oxidation treatment is the most critical processing step for determining the final properties of the manufactured carbon fibers. Economic estimates indicate that the stabilization step represents at least 20% of the total product cost and more than 30% of the total processing cost, and 70-85% of the total fiber processing time.

U.S. Pat. No. 3,699,210 teaches the use of laser sources for the carbonization and graphitization of PAN that had been fully oxidized at temperatures ranging from 180-500° C.

U.S. Pat. No. 3,914,394 teaches the use of ultrasonic waves in a liquid medium on fiber that had been pre-oxidized at temperatures below 400° C. After carbonization, the fibers had a higher strength and higher modulus of elasticity.

Many patents teach the treatment of the virgin and/or partially oxidized fiber with stabilization/oxidation promoting chemical agents. Early examples include U.S. Pat. Nos. 3,933,986; 3,820,951; 3,817,700; 3,814,577, 3,720,759; and 3,708,326. More recent examples include U.S. Pat. Nos. 6,733,737; 6,054,214; and 5,804,108.

U.S. Pat. No. 4,197,282 teaches the use of microwave energy only (rather than plasmas) to couple energy into pitch-based fibers (PAN based fibers do not couple microwave energy due to an extremely low value in the dielectric loss factor over a wide frequency range). The '282 patent therefore only applies to fibers that contain a sufficient quantity of carbon in the precursor to enable the efficient coupling of microwave energy into the fiber material. Furthermore, '282 is directed to the carbonization and graphitization of pitch-based fibers, not the oxidation or stabilization of thermoplastic materials such as PAN.

U.S. Pat. Nos. 5,412,246 and 5,330,935 are directed to forming a thin film on the surface of a semiconductor device and not to the carbon fiber production process.

U.S. Pat. No. 6,372,192 teaches the combined use of microwave energy and microwave based plasma for the carbonization and graphitization of carbon fiber. That work was independent of precursor material, but is limited to the carbonization and graphitization of materials that already have been substantially or fully oxidized/stabilized by some other means. The scope of '192 does not address the initial and broad oxidation/stabilization production stage.

U.S. Pat. No. 6,514,449 teaches the use of microwave energy and plasma to modify the surface topography of carbon fiber. The scope of '449 does not relate to the any of the oxidation/stabilization, carbonization or graphitization stages of carbon fiber production process.

US Patent Application Publication No. 2003/0051993 A1 describes a "nonthermal capillary discharge plasma" device for activating various chemical reactions. Among other chemical processes, this patent application suggests the idea of applying the device to stabilize PAN fibers; however, the publication does not provide enabling details for a viable PAN stabilization process nor present evidence that the process has been successfully implemented.

Drzal et al. describe the generation of ozone in water in conjunction with UV light to oxidize the surface of a variety of substrates (see U.S. Pat. No. 6,565,927 issued May 20, 2003). U.S. Pat. Nos. 6,648,973 and 6,649,255 issued on Nov. 18, 2003 were also limited to surface treating filaments of material and not to the bulk oxidation of polymeric fibers. These references describe the use of UV light for the decomposition of ozone contained in a surrounding gas to create monatomic oxygen, which interacted with the surface of a filament, i.e. carbon fibers, to create active chemical sites on the surface of the filament.

Objects and Advantages

Objects of the present invention include the following: providing a method for oxidizing and stabilizing thermoplastic materials prior to carbonization; providing a method for more rapid and cost-effective treatment of PAN fibers by exposure to reactive oxidative species; providing a method for oxidation and stabilization of polymeric materials that is faster and requires less physical space; providing a method for stabilizing PAN fibers that creates a more uniformly stabilized fiber that can yield a more uniform product after carbonization; and, providing a method of polymer stabilization in which the polymer is contacted by reactive oxidative species formed by the decomposition of ozone. These and other objects and advantages of the invention will become apparent from consideration of the following specification, read in conjunction with the drawings.

SUMMARY OF THE INVENTION

According to one aspect of the invention, an apparatus for treating polymeric material comprises: a treatment chamber adapted to maintain a selected atmosphere at a selected pressure at a selected temperature; a source of ozone-containing gas in fluid communication with the chamber, the gas capable of decomposing at the selected temperature to yield at least one reactive oxidative species; and, a means for supporting the polymeric material within the chamber wherein the polymeric material will be exposed to the reactive oxidative species, whereby the polymeric material is stabilized and cross-linked to a selected degree through the exposure in the chamber at the selected temperature.

According to another aspect of the invention, a method for treating polymeric materials comprises exposing the polymeric material to an ozone-containing gas at a selected temperature sufficient to decompose the ozone to yield at least one reactive oxidative species, whereby through exposure to the reactive oxidative species the polymeric material is stabilized and cross linked to a sufficient degree to render the polymeric material suitable for subsequent carbonization treatment at a temperature of at least 500° C.

According to another aspect of the invention, a method for treating polymeric materials comprises exposing the polymeric material to an ozone-containing gas at a selected temperature sufficient to decompose the ozone to yield at least one reactive oxidative species, whereby through exposure to the reactive oxidative species the polymeric material is stabilized and cross linked to a sufficient degree to render the polymeric material flame retardant.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore non-limiting embodiments illustrated in the drawing figures, wherein like numerals (if they occur in more than one view) designate the same elements. The features in the drawings are not necessarily drawn to scale.

DETAILED DESCRIPTION OF THE INVENTION

Figure 1:
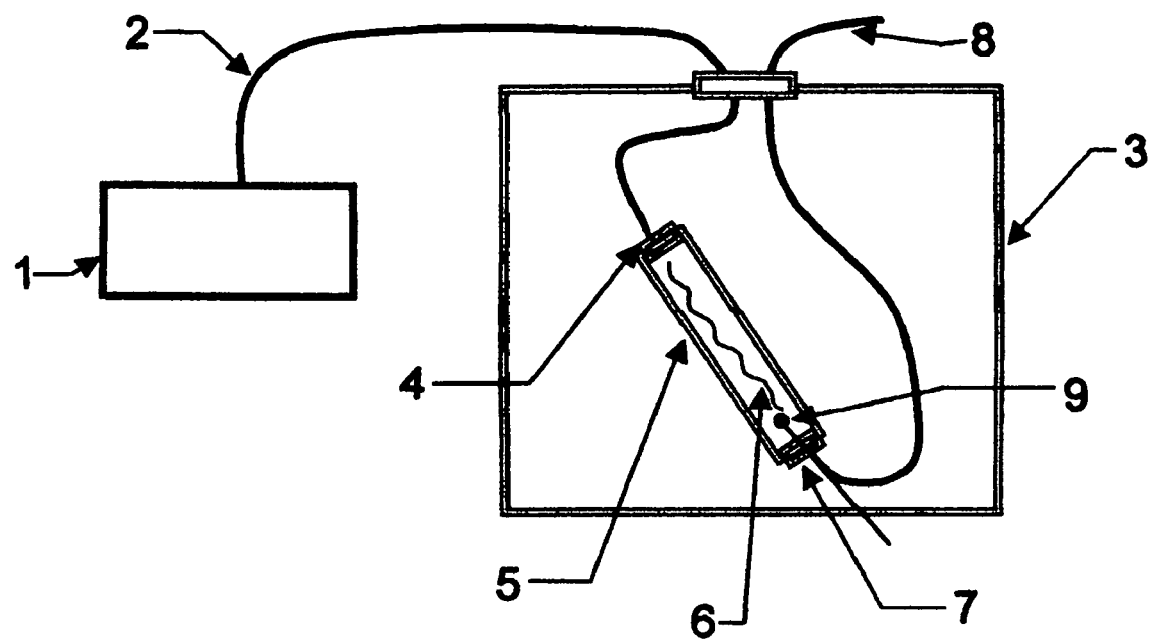
FIG. 1 is a schematic diagram of one embodiment of the present invention.

The invention is a new technique to increase the speed of oxidation or chemical cross-linking of PAN fibers or other polymeric materials. This technique is based on the use of reactive oxidative species (ROS), such as monatomic oxygen (O), instead of diatomic molecular oxygen ($O_2$), to increase the rate of diffusion of oxygen into the polymer so that unreacted, non-oxidized material inside of the fibers may be more efficiently treated. By increasing the overall rate of diffusion, more oxygen will be available to complete the second subphase of oxidation in the thermosetting phase in the manufacturing of PAN-based carbon fibers. One particular reactive oxidative species, atomic oxygen, not only has half the mass of molecular oxygen but also is much more chemically reactive and will not need to dissociate after diffusing into the unreacted interior region of the fiber before it can react with the PAN.

Applicants' co-pending U.S. patent application Ser. No. 11/344,573 describes methods for exposing polymer fibers to reactive oxidative species that have been created in various plasma devices. Applicants disclosed, among other things, the use of a plasma to create ozone, followed by a thermal step to dissociate the ozone into other reactive species, particularly atomic oxygen. Applicants postulated that some of the observed benefits of that process may be achieved by generating ozone in various other ways, and then subjecting the ozone to thermal decomposition. In this manner, the benefits of reactive oxidative species may be obtained through a purely chemical process without the need for a microwave plasma generator.

A series of research experiments led to the development of three different methods for the rapid oxidation process. The original research for rapid oxidation began by placing precursor PAN fiber within the treatment volume of a non-thermal plasma that generated the ROS. This research effort was followed by placing the PAN fiber a short-distance downstream of a ROS-generating non-thermal plasma volume. Later, there was evidence to support the concept that the precursor fibers could be substantially removed in distance from the plasma generator, if the temperatures were suitably high and the ozone concentration sufficient for a specific length of the processing device.

In the testing that followed, the precursor fiber was placed in a container inside an oven that was filled with ozone, whereby the ozone was thermally decomposed to create ROS that oxidized the fiber. This last method was further refined to a design in which the fiber is run continuously through a tube which was heated to different temperatures along the length while ozone flowed through the tube. The first two methods are disclosed in Applicants' co-pending application. The last method and several further improvements are described in the examples that follow. In all Examples, the gas composition (% O$_2$/% N$_2$) represents the composition of the gas that was fed into the ozone generator.

The initial testing for technical feasibility for this new polymeric oxidation and stabilization technique was accomplished using precursor PAN fibers located inside a quartz tube placed inside an oven, in which ozone (produced externally by an atmospheric plasma generator) was thermally decomposed. This concept is illustrated in FIG. 1. With the oven temperature around 200° C., the initial resulting stabilization/oxidation, (which is an exothermic process) was so rapid that the fibers ignited. Subsequent testing with milder processing conditions such as lower temperatures and with fibers partially pre-oxidized to reduce the exothermic reaction, allowed the fiber to be oxidized/stabilized in a controlled, stable manner, as summarized in Table 1.

EXAMPLE 1

As shown schematically in FIG. 1, a commercial ozone generator 1 (Model AX8200, ASTeX Products, 90 Industrial Way, Wilmington, Mass. 01887) was connected via a PTFE tube 2 into a mechanically programmable oven 3 (Model DKN400, Yamato Scientific America, 925 Walsh Ave., Santa Clara, Calif. 95050) through a silicone rubber inlet stopper 4, and into a 1.25" I.D.×14" long quartz tube 5 containing the PAN precursor 6. Exhaust from the quartz tube passed out through exit stopper 7 and into another PTFE tube 8 for disposal. In addition to the set temperature control of the oven 3, three different thermocouples were inserted, one into the oven volume, another at the interior inlet of the quartz tube, and one (shown at 9) at the interior exit end of the quartz tube. During initial testing, the ozone-containing process gas at 6 slpm initially entered the oven at room temperature and became heated as it passed into the quartz tube and over the fibers. This gas contained no more than 10% ozone by volume, and as it heated, increasing amounts of ROS such as monatomic oxygen were thereby produced by thermal decomposition.

TABLE 1

Densification of PAN Exposed to Heated Ozone

| Treatment time, min | Temp., ° C. | % O$_2$/ % N$_2$ | Starting density, g/cc | Treated density, g/cc |
| --- | --- | --- | --- | --- |
| >0.5 | 200 | 90/10 | 1.235 | fiber burned |
| >0.5 | 185 | 90/10 | 1.235 | fiber burned |
| 30 | 185 | 90/10 | 1.288 | 1.30-1.36 |
| 30$^a$ | 185 | 20/80 (air) | 1.288 | 1.28-1.29 |
| 30$^a$ | 185 | 90/10 | 1.288 | 1.30-1.31 |

$^a$Control samples run without ozone decomposition treatment

In the test described in the foregoing example, the fibers were processed non-uniformly to some degree, which Applicants attribute to the fact that the rate of decomposition of the ozone changes as it passes through the tube and continues to heat. The rate of ozone decomposition is dependent on the diameter and length of the tube, the thermal heating profiles applied to the walls of the tube and both the composition and the flow rate of the processing gas. The gradients in the decomposition of the ozone into oxidative species led to the variation in densification seen in Table 1. These observations then led to the construction of a continuous processing system in which the fiber tow moves through the tube, thereby averaging the exposure to various conditions so that the fiber is processed more consistently.

The surprising and beneficial effect of Applicants' process may be seen by comparing the foregoing result to that of "conventional" PAN oxidation as described in "Fundamental Studies of Stabilization of Polyacrylonitrile Precursor" [S. A. White, MS Thesis, University of Tennessee, Knoxville, May 2005, pp. 81-90]. In that reference, minimal amounts of oxidation were seen after processing PAN precursor materials for up to 24 hours at 160 or 180° C. in air as well as after processing for 60 minutes at 215° C. in pure oxygen.

EXAMPLE 2

Figure 2:
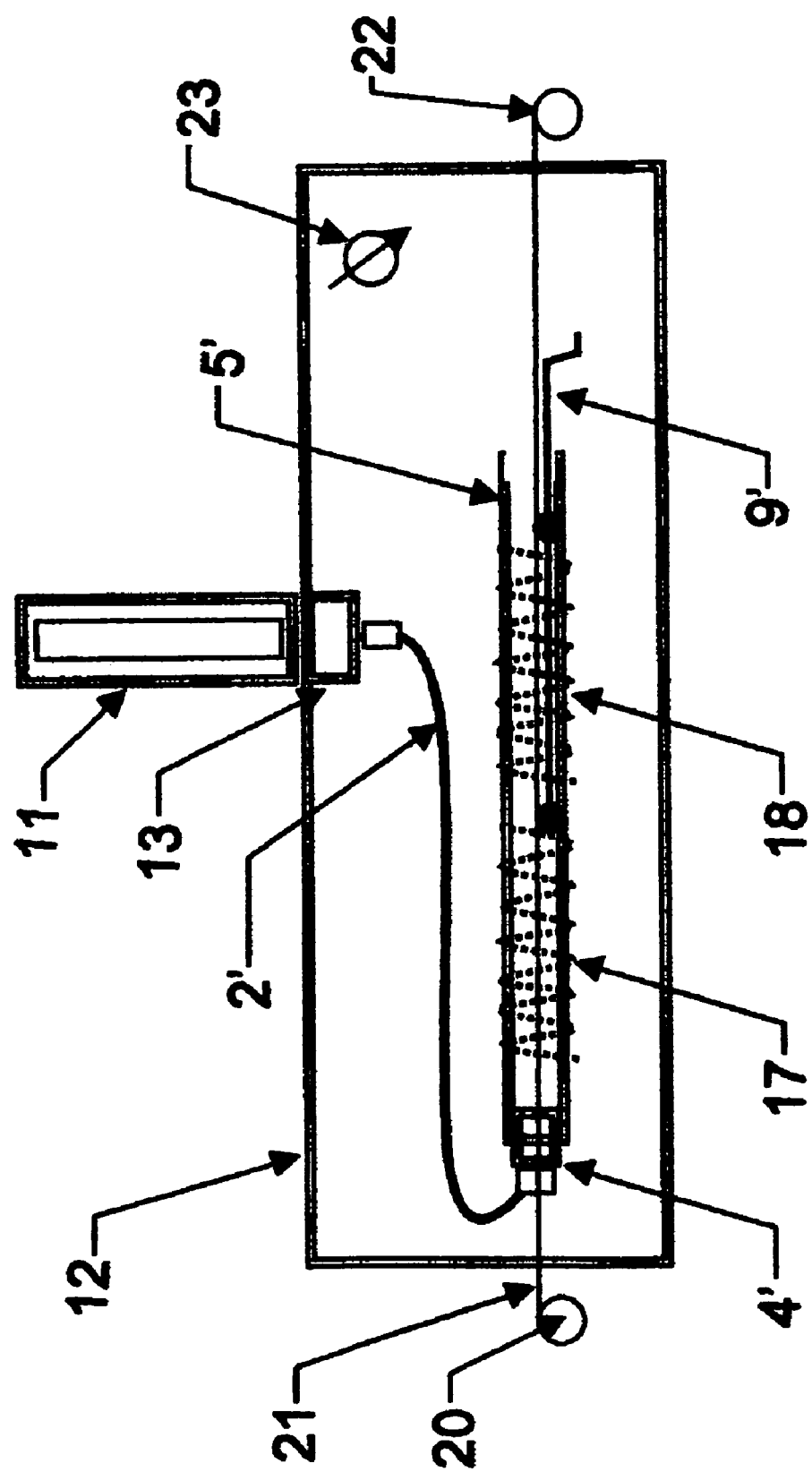
FIG. 2 is a schematic diagram of an embodiment of the present invention adapted to process fiber continuously.

FIG. 2 shows schematically a continuous-fiber processing system. Ozone was supplied from a diffuse dielectric barrier plasma discharge device 11 which sat atop an safety enclosure chamber 12 The ozone was collected at the exit 13 of the plasma device 11 and transferred via a PTFE hose 2' to the inlet 4' of a quartz tube 5' that had two separately heated sections 17, 18. Each heated section was about 10" long and consisted of heater wire wound externally around the quartz tube and was equipped with a thermocouple 9' to monitor the internal temperature. Supplied from a reel 20 the precursor tow 21 consisting of 3k filaments was fed through the heated tube to a take-up reel 22 The interior of the enclosure was maintained at slightly negative pressure via an exhaust port 23. Results of several runs using this setup are summarized in Table 2.

TABLE 2

Densification of Moving PAN Tow in Heated Ozone

| Treatment time, min | Temp., ° C. Inlet/ 1$^{st}$/2$^{nd}$ zones | % O$_2$/ % N$_2$ | Starting density, g/cc | Treated density, g/cc | Remnant Heat, J/g |
| --- | --- | --- | --- | --- | --- |
| ~33 | 30/192/226 | 95/5 | 1.235 | 1.337 | 408 |
| ~27 | 28/190/234 | 95/5 | 1.235 | 1.301 | 578 |
| 30$^a$ | 28/190/230 | 20/80 (air) | 1.235 | 1.32-1.33 | n/a |
| 30$^a$ | 28/190/230 | 95/5 | 1.235 | 1.28-1.29 | n/a |

$^a$Control samples run without ozone decomposition treatment

Experimental testing with this device revealed that the optimal line speed of the polymeric precursor was dependent on both the residence time and length of the heating zones for a specific concentration of ozone. Parametric testing demonstrated a threshold temperature to begin oxidation and maximum temperatures to prevent fiber damage (exothermic induced burning). Table 2 presents the results of two sample runs. The remnant heat or amount of exothermic reaction remaining to the fiber was also measured for these samples, which indicated that the fibers had undergone significant oxidation. The remnant heat for conventional fiber that has not been oxidized is ~1300 J/g and for fully oxidized material (commercially accepted as fully oxidized PAN fiber with a bulk density of 1.39 to 1.40) is ~250 μg. The remnant heat was obtained using differential scanning calorimetry (DSC) at a heating rate of 20° C./min in dry air, during which the exothermic heat was integrated between room temperature and 300° C.

As mentioned in Applicants' co-pending application, processing polymeric material with reactive oxidative species from either a plasma source or thermal decomposition of ozone, may accelerate the oxidation process such that a final density of 1.40 g/cc is not required. It is understood that the goal of oxidation is not a particular density per se, but rather a degree of chemical conversion of the polymeric material that is sufficient to render it infusible and capable of tolerating the subsequent higher temperature processing to convert it to carbon fiber. Fiber density does correlate with other parameters in the sense that, ceteris paribus, higher density generally indicates greater stabilization.

EXAMPLE 3

Figure 3:
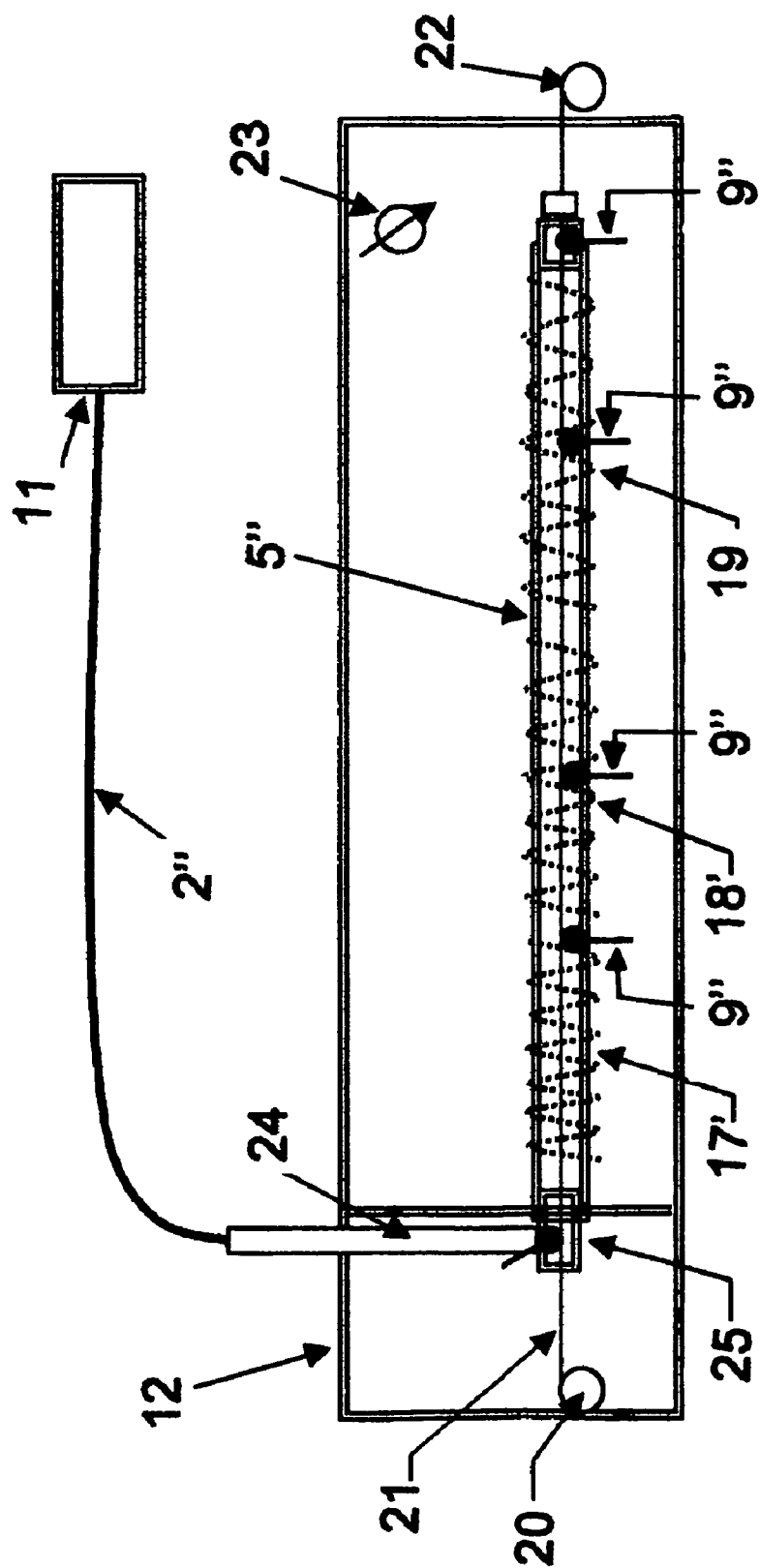
FIG. 3 is a schematic diagram of another embodiment of the present invention adapted to process fiber continuously.

FIG. 3 shows another embodiment of the present invention that is configured to have additional heaters and a generally longer processing chamber so that the fibers would have a greater residence time for a given line speed. This allows the fiber to proceed through a more gradual temperature gradient and to be processed at a higher line speed. In excess of 100 experiments were performed using this embodiment of the inventive device. Ozone was supplied from a difuse dielectric barrier plasma discharge device 11, which is situated separately from the fiber processing unit that is enclosed in a safety enclosure chamber 12. The ozone was transferred via ~25' PTFE hose 2" to an inlet preheater 24 which was connected to one side of a tee 25. The other side of the tee was connected to a quartz tube 5" that had three separately heated sections 17', 18', 19. Each heated section (5", 9", and 11" long, respectively) consisted of heater wire wound externally around the quartz tube 5" and each was equipped with a thermocouple 9" to monitor the internal temperature. This reactor also featured two additional thermocouples 9" to monitor the inlet and exit temperatures of the quartz tube. Supplied from a reel 20 the precursor tow 21 consisting of 3k filaments was fed through the heated tube to a take-up reel 22. The interior of the enclosure was maintained at slightly negative pressure via an exhaust port 23.

The processing device described in the foregoing example functioned at a variety of operating conditions (i.e. line speeds and thermal profiles) that demonstrated a range of oxidation rates that were well in excess of the comparable conventional thermal processing of ~90 minutes. As can be seen in the data shown in Table 3, the inventive oxidation process is between 2.5 to 4 times faster than conventional processing (20-36 minutes vs. 90 minutes).

TABLE 3

Densification of Moving PAN Tow in Heated Ozone

| Treatment time, min | Temp., ° C. $1^{st}/2^{nd}/3^{rd}$ zones | % $O_2$/ % $N_2$ | Starting density, g/cc | Treated density, g/cc |
|---|---|---|---|---|
| ~36 | 170/190/215-230 | 95/5 | 1.235 | 1.36 |
| ~36 | 180/200/223-231 | 95/5 | 1.235 | 1.37 |
| ~36 | 174-183/200-215/226-236 | 95/5 | 1.235 | 1.40 |
| ~20 | 145/190/225 | 95/5 | 1.235 | 1.37 |
| $30^a$ | 178/207/230 | 20/80 (air) | 1.235 | 1.33-1.34 |
| $30^a$ | 178/207/230 | 95/5 | 1.235 | 1.33-1.34 |

$^a$Control samples run without ozone decomposition treatment

EXAMPLE 4

In additional testing, a four-zone heating configuration with zone temperatures of 105, 165, 205, and 245° C. respectively produced fiber with remnant heat values less 230 J/g. Fiber with an initial density of 1.244 was processed to a final density in excess of 1.40 g/cc. This result was accomplished using a continuous processing system operating at ~1.5 inches per minute and 30 minutes of treatment using a gas flow of 6 sipm. Gas flow into the ozone generator consisted of 95% oxygen and 5% nitrogen, and the gas supplied into the processing chamber contained ~4% ozone.

EXAMPLE 5

Figure 4:
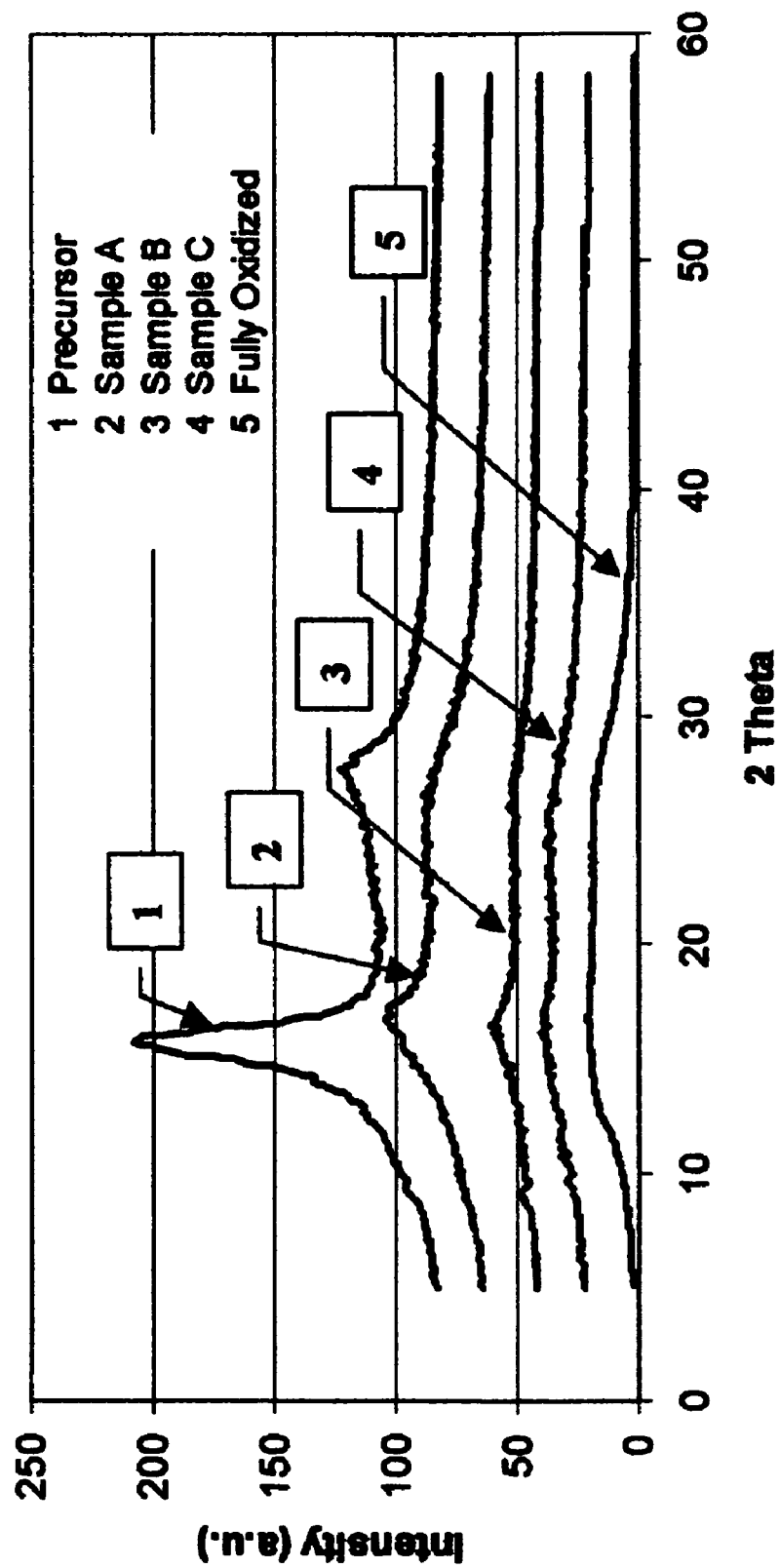
FIG. 4 is a plot of wide-angle X-ray diffractograms for several PAN fibers processed according to the present invention.

As mentioned previously, density change alone is not necessarily a sufficient parameter to track the progress of the chemical oxidation of polymeric materials. In FIG. 4, data from several wide-angle X-ray diffractograms indicates the degree of fiber oxidation. Samples A, B and C are the first three samples in Table 3. The starting value of the arbitrary intensity for each sample was initially zero but has been intentionally displaced to aid in viewing the diffractograms for each of the samples.

In the foregoing examples, the ozone-generating device relied on a plasma discharge to create the ozone. Those skilled in the art will appreciate that there are many alternative approaches to generating ozone, many of which are purely chemical and do not involve the creation of a plasma. Ozone may be synthesized by a process analogous to that occurring in the upper atmosphere, wherein atomic oxygen, formed by the photodissociation of oxygen by short-wavelength UV radiation ($\leqq 240$ nm), reacts with molecular oxygen form ozone. At low conversions, the limiting quantum yield is ~2. The maximum steady-state ozone concentration (~3.5 mol %) depends on temperature, pressure, and whether oxygen or air is used; the time to reach steady-state depends on the light intensity. Efficiencies as high as 9% can be obtained, at low ozone concentration, by using narrow-band UV radiation from a xenon excimer laser operating at 172 nm In practice, ozone concentrations obtained by commercial UV devices are low. This is because the low intensity, low pressure mercury lamps employed produce not only the 185-nm radiation responsible for ozone formation, but also the 254-nm radiation that destroys ozone, lowering the quantum yield to ~0.5 compared to the theoretical yield of 2.0. Furthermore, the low efficiency (~1%) of these lamps results in a low ozone production rate of ~2 g/kWh. Typical ozone output of a commercial 40-W UV lamp using air is ~0.5 g/h and a maximum concentration of 0.25 wt %. High current density electrolysis of aqueous phosphate solutions at room temperature produces ozone and oxygen in the anodic gas. Electrolysis of 68 wt % sulfuric acid can produce 18-25 wt % ozone in oxygen when a well-cooled cell is used. Although electrolysis of water can produce high concentrations of ozone, the output is low, and the cost is several times more than that of electric discharge processes. Ozone can be prepared radiochemically in gaseous or liquid oxygen with $\beta$- and $\gamma$-rays from radioactive isotopes or a nuclear reactor. In the laboratory, pure liquid ozone can be produced quantitatively by cooling a stream of atomic oxygen in oxygen at liquid nitrogen temperatures (−196° C.) according to the reaction: $O+O_2+M \rightarrow O_3+M$, where M is the cold reactor wall. Pure stable gaseous ozone also can be prepared quantitatively by electric discharge (using a Tesla coil) through oxygen cooled with liquid nitrogen followed by warming to room temperature. Other exemplary processes include: electrolysis of percloric acid ($HClO_4$); slow oxidation of phosphorus in the presence of high concentration of $O_2$; introducing hot (glowing red) platinum into liquid air; and, using a reaction of concentrated sulfuric acid over barium peroxide and/or potassium permanganate.

The ozone source may be located at any convenient distance from the processing chamber, but will preferably be close enough to minimize losses due to decomposition within the transport piping. Ozone has a half-life of around 20 to 30 minutes at ambient temperature, which effectively prevents it from being stored conveniently in gas bottles; furthermore, concentrations higher than 12 can be explosive.

In general, the inventive process operates in a temperature range similar to that of conventional processing; the preferred temperature range is about 100 to 400° C. For the specific case of PAN fibers, Applicants prefer to treat in the range of about 120 to about 300° C., and more preferably about 150 to 250° C. The ozone concentration may range in value, depending on fiber type and processing objectives, but for the specific case of PAN fibers, it is preferably less than about 20% and more preferably less than about 10% by volume of the gas composition in the fiber treatment chamber.

Because the early stages of fiber oxidation are strongly exothermic, the best results are obtained by gradually increasing the process temperature as the fiber becomes more oxidized. This is preferably achieved through the use of multiple heating zones whereby the process temperature is increased in a stepwise manner as a fiber tow passes through the processing chamber, or more preferably through the establishment of a continuous thermal gradient in the processing chamber.

As shown in the drawings, the ozone-containing gas may be injected at one end of the reactor, passing through the reactor either in parallel or in counterflow relationship to the direction of travel of the fiber tow. Alternatively, the system may have multiple ports for ozone injection along the processing length. In this case, the gas injected at each of the separate ports may have the same ozone concentration, or different concentrations may be injected at different ports, whereby the skilled artisan may easily balance temperature, decomposition rates, oxidation rates, etc. through routine experimentation.

In the examples shown, heat was applied continuously and good results were obtained with relatively simple equipment and process recipes. It will be appreciated that the inventive system may alternatively be operated in various pulsed or non-steady-state modes. For example, one could employ pulsed heating, which would allow ozone to fill the processing volume in a first step, followed by decomposition in a second step. Thermal energy may be applied by any conventional means, including a variety of heating elements, IR lamps and $CO_2$ lasers as are well known in the art. Heating elements may also be disposed in close proximity to the fibers whereby decomposition of the ozone is concentrated in a selected volume near the fiber. IR radiation could be used to selectively heat the fibers, leaving the volume of gas relatively cool, having the resulting effect that the ozone decomposition would occur only in close proximity to the fiber surface. The decomposition of ozone to various ROS may also be accomplished using UV light, ionizing radiation, etc. The rate of decomposition of ozone to various ROS is also influenced by a variety of factors including the geometric design of the processing reactor, method of decomposing the ozone, and the aerodynamic properties of the processing gas.

It will be apparent to skilled artisans that the fiber tow may take several passes through the processing device. Conventional means may also be employed to support the fiber within the treatment chamber as well as to maintain a selected tension on the fiber tow during processing. The processing unit may consist of several similar units operating in a modular manner in either series or parallel arrangements to achieve the desired throughput.

Surface treatment processes taught generally by L. Drzal et al. in U.S. Pat. Nos. 6,565,927, 6,648,973 and 6,649,255 are conducted at low temperatures in order to minimize the diffusion of active species into the fiber or substrate. By contrast, Applicants' process is intended to modify not only the surface properties but, more importantly, also the bulk properties of PAN or other fiber precursor materials. For this reason, Applicants' preferred treatment temperatures are such that significant bulk diffusion occurs throughout substantially most or all of the fiber volume.

It will be further understood that the description of exemplary processes carried out at atmospheric pressure should not be interpreted to limit the inventive process to precisely one atmosphere; on the contrary, the claimed process may be performed at any selected pressure, which might be less than one atmosphere or more than one atmosphere. It will be appreciated that the same chemical reactions may be carried out at either lower or higher pressures than atmospheric. Using lower pressure may provide better control when oxidizing particularly reactive precursor materials but will also involve additional costs and mechanical complexity. Using higher pressures may be beneficial in other cases; in particular, slightly higher pressures can prevent the leakage of ambient air into the reactor while introducing very little added cost or complexity. Based on research for conventional processing in air or oxygen-enriched air, significantly higher pressures, i.e. 2-5 atm or more may also yield further improvements in the oxidation rate.

The foregoing examples focused on the use of PAN as the thermoplastic precursor material in order to clearly show the effects of process variables in carrying out the invention. Those skilled in the art will appreciate that the invention may be readily applied to other well-known fiber precursor materials. Some of these other materials include, but are not limited to 1) rayon fibers or cellulosic fibers (including natural or green fibers), lignin and lignin-base/blended precursors; 2) polyalkenes and polyolefins through PVC including exotic rigid rod polymers; 3) polyethylene, polypropylene, polybutadiene; 4) polyesters such as polyethylene terephthalates (PET); 5) polybutylene terephthalates (PBT); 6) pitch; 7) other low cost thermoplastic-based polymeric precursors including commodity grade, i.e., carpet grade and chemically modified carpet grade PAN and other chemically modified or pretreated thermoplastic precursors; 8) chemically modified precursors, such as chemically modified, or chemically compounded precursors; and 9) bio-engineered fibers (i.e. bio-manufactured spider-silk or similar filaments).

It will be understood that the invention is not limited specifically to fiber tows; other types of polymer that may be processed include single filaments, woven or knitted structures, felted structures, flat ribbons, sheets or films, and monolithic shapes. When the apparatus is configured for continuous processing, i.e., the treatment chamber has an inlet and an outlet opening, it will be understood that the polymer itself may be substantially continuous or alternatively the polymer may comprise a plurality of discrete components carried on a substantially continuous moving conveyor.

As used herein, the term "means of support" can include supporting structures that may reside either inside or outside of the treatment chamber. For a batch-type process, the preferred support will be a generally flat surface upon which the polymer material may rest, the surface preferably being chemically inert at the process conditions being used. For a continuous process, the preferred support comprises a feed reel and a take-up reel, both generally located outside of the treatment chamber. In this case the polymer is suspended between these reels and preferably held in a controlled state of tension by conventional means, preventing it from touching or dragging on the internal surfaces of the treatment chamber. As is well known in the art, the reels may further be disposed to spread a fiber tow from its naturally cylindrical shape into a generally flat or ribbon-like configuration for better management of heat and gas flow around the fibers. It will be understood that the entire process may be conducted with the polymer following a substantially horizontal path as shown in the examples or with the path oriented vertically if desired (for example, to reduce the amount of floor space occupied by the equipment). The system may further be configured to allow for the polymer to make more than one pass through the treatment chamber if desired. In another embodiment, a continuous conveyor system may be provided to move a series of substantially identical discrete polymer objects through the treatment chamber.

As described in Example 1, the initial oxidation reactions can lead to exothermic runaway if not controlled. One means of controlling the early stages of oxidation is to pre-treat the fibers and thereby pre-stabilize the precursor material before direct exposure to the ROS. Such pre-stabilization may be done not only by a thermal process (mild heating) but also by other means such as exposure of the fiber tow to UV, e-beam, microwave, gamma, or X-ray treatment. It will be appreciated that the inventive apparatus may include such means of pretreatment, either as an integral part of the apparatus or as an optional "bolt-on" accessory. Alternatively, such pretreatment may be carried out in a substantially separate apparatus, in which case the pretreated fiber tow may be stored in any convenient form, particularly on reels that may be compatible with the handling and feed mechanism employed to carry the tow through the ozone treatment chamber.

Although fibers treated by the inventive process are particularly suitable for further processing, typically carbonization, it will be understood that Applicants' stabilized fibers may be used without further processing, for example to make flame retardant fabrics. An accepted measure of flame retardant properties is the Limiting Oxygen Index (LOI) [see ISO 4589-1 and 4589-2 and also ASTM D2863]. For oxidized PAN fibers LOI generally increases with density from about 50 at a density of 1.35 to about 60 at a density of 1.45. Acceptable flame retardant properties are defined as LOI≧30. From the density values of the treated samples shown in Table 3, it is apparent that the inventive process suitable for making flame retardant fibers suitable for use in mattresses, furniture upholstery, automobile components, and other uses where flammability is a pertinent design factor.

Furthermore, although Applicants' process may yield fiber that is suitable for subsequent carbonization at temperatures of at least 500° C., Applicants' process may also be used to create fiber products having some selected intermediate value of stabilization or oxidation, for example, to prepare partially stabilized fiber for other treatments or applications.

We claim:

1. An apparatus for treating polymeric material comprising:
   a first chamber including a gas generator configured to generate a supply of ozone-containing gas, said gas capable of decomposing at a selected temperature to yield at least one reactive oxidative species;
   a second chamber adapted to maintain a selected atmosphere at a selected pressure at said selected temperature;
   fluid communication means whereby said ozone-containing gas generated in said first chamber may be introduced into said second chamber at a selected rate; and
   a means for supporting said polymeric material within said second chamber wherein said polymeric material will be exposed to said reactive oxidative species whereby said polymeric material is stabilized and cross-linked to a selected degree through said exposure in said second chamber at said selected temperature.

2. The apparatus of claim 1 wherein said gas generator comprises an ozone generator employing a plasma discharge in an oxygen-containing gas.

3. The apparatus of claim 1 wherein said gas generator comprises a process selected from the group consisting of: photodissociation of gaseous oxygen; radiolysis of liquid oxygen; electrolysis of sulfuric acid; electrolysis of percloric acid ($HClO_4$); slow oxidation of phosphorus in the presence of high concentration of oxygen; introduction of hot platinum into liquid air; and, reaction of concentrated sulfuric acid over barium peroxide and potassium permanganate.

4. The apparatus of claim 1 wherein said polymeric material is selected from the group consisting of: rayon fibers and cellulosic fibers, including natural and green fibers; lignin and lignin-base/blended precursors; polyalkenes and polyolefins through PVC including exotic rigid rod polymers; polyethylene, polypropylene, polybutadiene; polyesters including polyethylene terephthalates (PET); polybutylene terephthalates (PBT); pitch; low cost thermoplastic-based polymeric precursors including commodity grade, carpet grade and chemically modified carpet grade PAN and other chemically modified and chemically pretreated thermoplastic precursors; chemically compounded precursors; and bio-engineered fibers including bio-manufactured spider-silk filaments.

5. The apparatus of claim 1 wherein said polymeric material is polyacrylonitrile (PAN) and said selected degree of stabilization includes a density greater than about 1.30 g/cc.

6. The apparatus of claim 1 wherein said polymeric material is polyacrylonitrile (PAN) and said temperature between 100 and 400° C.

7. The apparatus of claim 6 wherein said temperature is between 150 and 250° C.

8. The apparatus of claim 1 wherein said polymeric material support structure comprises a substantially continuous fiber tow and said means of support comprises a feed reel, a take-up reel, and a tensioner configured to maintain a selected tension in said tow during said treatment.

9. The apparatus of claim 8 wherein said treatment chamber is configured to maintain a thermal gradient in the direction of travel of said fiber tow, whereby said exposure temperature is increased in a gradual manner as said fiber tow passes through said treatment second chamber.

10. The apparatus of claim 8 wherein said treatment chamber comprises at least two zones maintained at differing temperatures whereby said exposure temperature is increased in a stepwise manner as said fiber tow passes through said treatment chamber.

11. A method for treating polymeric materials comprising the steps of:
    generating an ozone-containing gas;
    decomposing the ozone-containing gas into monatomic oxygen; and
    exposes exposing said polymeric material to said monatomic oxygen to crosslink said polymeric material for subsequent carbonization treatment at a temperature of at least 500° C.

12. The method of claim 11 wherein said polymeric material is selected from the group consisting of: rayon fibers and cellulosic fibers, including natural and green fibers; lignin and lignin-basic/blended precursors; polyalkenes and polyolefins through PVC including exotic rigid rod polymers; polyethylene, polypropylene, polybutadiene; polyesters including polyethylene terephthalates (PET); polybutylene terephthalates (PBT); pitch; low cost thermoplastic-based polymeric precursors including commodity grade, carpet grade and chemically modified carpet grade PAN and other chemically modified and chemically pretreated thermoplastic precursors; chemically compounded precursors; and bio-engineered fibers including bio-manufactured spider-silk filaments.

13. The method of claim 11 wherein said polymeric material is polyacrylonitrile (PAN) and said selected degree of stabilization includes a density greater than about 1.30 g/cc.

14. The method of claim 11 wherein said polymeric material is polyacrylonitrile (PAN) and said decomposing the ozone-containing gas into monatomic oxygen comprises exposing the ozone-containing gas to a temperature between 100 and 400° C.

15. The method of claim 14 wherein said temperature is between 150 and 250° C.

16. The method of claim 11 wherein said polymeric material comprises a substantially continuous fiber tow and said tow is maintained at a selected tension during said exposing said polymeric material to said monatomic oxygen.

17. A method for treating polymeric materials comprising exposing said polymeric material to an ozone-containing gas at a temperature to decompose at last a portion of said ozone-containing gas to monatomic oxygen wherein exposure of said polymeric materials to said monatomic oxygen crosslinks said polymeric material to render said polymeric material flame retardant.

18. The method of claim 17 wherein said polymeric material has a limiting oxygen index (LOI) of at least 30 followings exposure to said monatomic oxygen.

19. The method of claim 18 wherein said polymeric material is PAN and said material has a density greater than about 1.30 g/cc and an LOI of at least 50 following exposure to said monatomic oxygen.

20. The apparatus of claim 1 wherein the reactive oxidation species is monatomic oxygen.

21. The apparatus of claim 1 wherein the second chamber comprises a tube having heater wire wound externally about the tube.

* * * * *